US008012024B2

(12) United States Patent
Wolinsky

(10) Patent No.: US 8,012,024 B2
(45) Date of Patent: *Sep. 6, 2011

(54) METHOD AND APPARATUS FOR SIMULATING GAME ACCESSORIES

(75) Inventor: Scott Wolinsky, North Wales, PA (US)

(73) Assignee: New Illuminations LLC, Wilmington, DE (US)

( * ) Notice: Subject to any disclaimer, the term of this patent is extended or adjusted under 35 U.S.C. 154(b) by 1076 days.

This patent is subject to a terminal disclaimer.

(21) Appl. No.: 11/249,056

(22) Filed: Oct. 12, 2005

(65) Prior Publication Data

US 2006/0073895 A1    Apr. 6, 2006

Related U.S. Application Data

(63) Continuation of application No. 09/823,877, filed on Mar. 29, 2001, now Pat. No. 7,063,619.

(51) Int. Cl.
*A63F 13/00* (2006.01)

(52) U.S. Cl. ........... 463/41; 463/40; 463/42; 379/88.21; 379/93.23; 379/433.07; 446/141; 446/142

(58) Field of Classification Search ................ 463/1–42; 446/141, 142; 379/93.13, 88.19
See application file for complete search history.

(56) References Cited

U.S. PATENT DOCUMENTS

| 3,654,392 | A | * | 4/1972 | Beinhocker et al. | ........ 379/93.13 |
| 3,932,709 | A | | 1/1976 | Hoff et al. | ........ 379/157 |
| 4,082,285 | A | * | 4/1978 | Bathurst | ........ 463/14 |
| 4,242,539 | A | | 12/1980 | Hashimoto | ........ 379/142.01 |
| 4,372,558 | A | | 2/1983 | Shimamoto et al. | ........ 463/41 |
| 4,386,773 | A | | 6/1983 | Bronstein | ........ 463/44 |
| 4,421,314 | A | | 12/1983 | Stancill | ........ 273/249 |
| 4,432,067 | A | | 2/1984 | Nielsen | ........ 463/44 |

(Continued)

FOREIGN PATENT DOCUMENTS

JP    2000358086 A  * 12/2000

(Continued)

OTHER PUBLICATIONS

"Merlin The Electronic Wizard", Parker Brothers, 1978, <http://www.handheldmuseum.com/Manuals/ParkerBros-Merlin.pdf>, <http://en.wikipedia.org/wiki/Merlin_(game)>, last visited Jun. 15, 2010.*

(Continued)

*Primary Examiner* — Ronald Laneau
*Assistant Examiner* — Justin Myhr
(74) *Attorney, Agent, or Firm* — Stolowitz Ford Cowger LLP

(57) ABSTRACT

A method and apparatus are disclosed for simultaneously indicating, on each of a plurality of communication terminals, instructions transmitted by each terminal and the identity of the respective terminals that transmitted the instructions. Such a feature can be used to indicate the moves of parties playing a game over a telephone line. Once a communications link is established between two or more parties, their terminals are placed in a game mode which activates inband signal detection and player identification circuitry located within the terminals. Multi-colored indicators and player identification displays at each terminal are activated, their color being dependent upon the source of received instructions. In one embodiment, player identification indicators may be incorporated into a touch tone keypad located on the terminals. The keypad's touch tone keys are modified such that each key has two or more color coded indicators incorporated within, each color representing a particular player's move.

13 Claims, 14 Drawing Sheets

U.S. PATENT DOCUMENTS

| | | | | |
|---|---|---|---|---|
| 4,596,390 A | 6/1986 | Studley | | 463/47 |
| 4,922,420 A | 5/1990 | Nakagawa | | 463/29 |
| 4,959,783 A | 9/1990 | Scott et al. | | 463/22 |
| 5,039,107 A | 8/1991 | Jackson | | 273/237 |
| 5,048,831 A | 9/1991 | Sides | | 358/1.17 |
| 5,061,992 A | 10/1991 | Ueno | | 348/14.01 |
| 5,095,798 A | 3/1992 | Okada et al. | | 463/35 |
| 5,161,803 A | 11/1992 | Ohara | | 463/44 |
| 5,184,830 A | 2/1993 | Okada | | 463/29 |
| 5,186,471 A | 2/1993 | Vancraeynest | | 463/41 |
| 5,236,199 A | 8/1993 | Thompson | | 348/14.05 |
| 5,273,288 A | 12/1993 | Teshima et al. | | 463/41 |
| 5,349,633 A | 9/1994 | Katz | | 379/189 |
| 5,428,528 A | 6/1995 | Takenouchi et al. | | 463/42 |
| 5,518,253 A | 5/1996 | Pocock et al. | | 463/19 |
| 5,541,985 A | 7/1996 | Ishii et al. | | 379/111 |
| 5,558,339 A | 9/1996 | Perlman | | 463/23 |
| 5,563,931 A | 10/1996 | Bishop et al. | | 379/37 |
| 5,564,700 A | 10/1996 | Celona | | 463/27 |
| 5,618,045 A | 4/1997 | Kagan et al. | | 463/40 |
| 5,636,211 A | 6/1997 | Newlin et al. | | 370/465 |
| 5,643,088 A | 7/1997 | Vaughn | | 463/40 |
| 5,646,629 A | 7/1997 | Loomis | | 701/300 |
| 5,671,267 A | 9/1997 | August et al. | | 455/420 |
| 5,679,077 A | 10/1997 | Pocock et al. | | 463/19 |
| 5,685,775 A | 11/1997 | Bakoglu et al. | | 463/41 |
| 5,707,286 A | 1/1998 | Carlson | | 463/16 |
| 5,738,583 A | 4/1998 | Comas et al. | | 463/40 |
| 5,762,552 A | 6/1998 | Vuong et al. | | 463/25 |
| 5,790,652 A * | 8/1998 | Gulley et al. | | 379/368 |
| 5,791,992 A | 8/1998 | Crump | | 463/41 |
| 5,793,846 A | 8/1998 | Katz | | 379/127.01 |
| 5,795,156 A | 8/1998 | Redford | | 434/118 |
| 5,797,085 A | 8/1998 | Beuk et al. | | 455/88 |
| 5,809,520 A | 9/1998 | Edwards et al. | | 711/115 |
| 5,812,930 A | 9/1998 | Zavrel | | 725/62 |
| 5,852,783 A * | 12/1998 | Tabe et al. | | 455/566 |
| 5,859,522 A | 1/1999 | Theobald | | 320/106 |
| 5,864,613 A | 1/1999 | Flood | | 379/188 |
| 5,907,604 A | 5/1999 | Hsu | | 348/14.01 |
| 5,971,849 A | 10/1999 | Falciglia | | 463/16 |
| 5,971,855 A | 10/1999 | Ng | | 463/42 |
| 5,999,808 A | 12/1999 | LaDue | | 455/412.2 |
| RE36,574 E | 2/2000 | Hochstein | | 463/42 |
| 6,042,478 A | 3/2000 | Ng | | 463/42 |
| 6,080,064 A | 6/2000 | Pieterse et al. | | 463/42 |
| 6,085,112 A | 7/2000 | Kleinschmidt et al. | | 455/556.1 |
| 6,117,013 A | 9/2000 | Eiba | | 463/41 |
| 6,120,379 A | 9/2000 | Tanaka et al. | | 463/41 |
| 6,151,511 A | 11/2000 | Cruciani | | 455/558 |
| 6,165,068 A | 12/2000 | Sonoda et al. | | 463/8 |
| 6,188,917 B1 | 2/2001 | Laureanti | | 455/573 |
| 6,231,441 B1 | 5/2001 | Golad | | 273/237 |
| 6,241,612 B1 | 6/2001 | Heredia | | 463/40 |
| 6,244,894 B1 | 6/2001 | Miyashita | | 439/500 |
| 6,244,960 B1 | 6/2001 | Takasaka et al. | | 463/37 |
| 6,249,863 B1 | 6/2001 | Redford | | 713/1 |
| 6,264,562 B1 | 7/2001 | McSheffrey et al. | | 463/42 |
| 6,278,773 B1 | 8/2001 | Perlman et al. | | 379/142.06 |
| 6,280,327 B1 | 8/2001 | Leifer | | 463/39 |
| 6,287,201 B1 | 9/2001 | Hightower | | 463/41 |
| 6,327,482 B1 | 12/2001 | Miyashita | | 455/566 |
| 6,377,685 B1 | 4/2002 | Krishnan | | 379/368 |
| 6,383,075 B1 | 5/2002 | Jeong et al. | | 463/39 |
| 6,393,461 B1 | 5/2002 | Okada et al. | | 709/204 |
| 6,453,160 B1 | 9/2002 | Thomas et al. | | 455/419 |
| 6,494,762 B1 | 12/2002 | Bushmitch et al. | | 446/268 |
| 6,508,710 B1 | 1/2003 | Paravia et al. | | 463/42 |
| 6,524,189 B1 | 2/2003 | Rautila | | 463/40 |
| 6,527,641 B1 | 3/2003 | Sinclair et al. | | 463/39 |
| 6,554,707 B1 | 4/2003 | Sinclair et al. | | 463/39 |
| 6,579,184 B1 | 6/2003 | Tanskanen | | 463/41 |
| 6,612,498 B1 | 9/2003 | Lipponen et al. | | 235/486 |
| 6,612,931 B2 | 9/2003 | Kojima et al. | | 463/42 |
| 6,640,113 B1 | 10/2003 | Shim et al. | | 455/566 |
| 6,650,895 B1 | 11/2003 | Ravishankar et al. | | 455/422.1 |
| 6,669,487 B1 | 12/2003 | Nishizawa et al. | | 439/60 |
| 6,681,120 B1 | 1/2004 | Kim | | 455/556.1 |
| 6,690,947 B1 | 2/2004 | Tom | | 455/556.1 |
| 6,699,188 B2 | 3/2004 | Wessel | | 600/300 |
| 6,716,103 B1 | 4/2004 | Eck et al. | | 463/45 |
| 6,718,182 B1 | 4/2004 | Kung | | 455/556.1 |
| 6,785,561 B1 | 8/2004 | Kim | | 455/566 |
| 6,893,347 B1 | 5/2005 | Zilliacus et al. | | 463/41 |
| 6,908,389 B1 | 6/2005 | Puskala | | 463/40 |
| 6,920,517 B2 | 7/2005 | Mills et al. | | 710/301 |
| 7,121,962 B2 | 10/2006 | Reeves | | 473/407 |
| 2001/0003191 A1 | 6/2001 | Kovacs et al. | | 709/226 |
| 2001/0050977 A1 * | 12/2001 | Gerszber et al. | | 379/88.13 |
| 2002/0022522 A1 | 2/2002 | Yamada | | 463/42 |
| 2002/0025829 A1 * | 2/2002 | Kitatani | | 455/550 |
| 2002/0049074 A1 | 4/2002 | Eisinger et al. | | 455/552 |
| 2002/0049975 A1 | 4/2002 | Thomas et al. | | 725/60 |
| 2002/0065097 A1 | 5/2002 | Brockenbrough et al. | | 455/552 |
| 2002/0094845 A1 | 7/2002 | Inasaka | | 455/566 |
| 2002/0103023 A1 | 8/2002 | Matsuura et al. | | 463/31 |
| 2002/0119819 A1 | 8/2002 | Kunzle et al. | | 463/30 |
| 2002/0174277 A1 | 11/2002 | Hoshino et al. | | 710/105 |
| 2004/0185914 A1 | 9/2004 | Ohmura et al. | | 455/566 |
| 2004/0225796 A1 | 11/2004 | Hanson et al. | | 710/301 |

FOREIGN PATENT DOCUMENTS

| | | |
|---|---|---|
| WO | WO 93/23125 | 11/1993 |
| WO | WO 0021265 A1 * | 4/2000 |

OTHER PUBLICATIONS

"Master Merlin Nine All New Challenging Games", Parker Brothers, 1982, <http://www.handheldmuseum.com/Manuals/ParkerBros-MasterMerlin.pdf>, last visited Jun. 15, 2010.*

Online Monopoly, Dec. 28, 2000m [online], [retrieved from the PlaySite.com page using internet, <URL:http://www.playsite.com/t/games/board/monopoly/rules.html>, Rule pp. 1-4 and rules source code pp. 1-17.

Monopoly 2, 2000, [online], [retrieved on Aug. 18, 2004] Retrieved from the GameSpy.com page using Internet, URL:http://archive.gamespy.com/games/33.shtml.

"Microsoft Windows Installed Games," Computer Home.com, p. 1-4, retrieved Feb. 12, 2008 from http://www.computerhope.com/games/games/wingames.htm.

Genco Tic Tac Phone Description From GENCO Website; retrieved Oct. 4, 200; 2 Pages.

Stolowitz Ford Cowger LLP; Related Case Listing; Feb. 4, 2011; 1 Page.

* cited by examiner

LOGIC FOR DISPLAYING PLAYER IDs AT EACH PLAYER'S TERMINAL

IN TERMINAL PLACING OUTGOING CALL

IN TERMINAL RECEIVING INCOMING CALL

METHOD AND APPARATUS FOR SIMULATING GAME ACCESSORIES

REFERENCE TO RELATED PATENT APPLICATION

This application is a continuation and claims priority benefit of U.S. patent application Ser. No. 09/823,877, entitled METHOD AND APPARATUS FOR SIMULATING GAME ACCESSORIES, filed on 29 Mar. 2001, now U.S. Pat. No. 7,063,619 which application is hereby incorporated by reference in its entirety, including all figures, tables, and claims.

FIELD OF THE INVENTION

The present invention relates to the field of telecommunications as it relates to remote apparatus for enabling game players present at remote locations to play a game over a communications link.

DESCRIPTION OF THE RELATED ART

There are numerous known remote game systems in which players, present at various remote locations, can play a game by communicating coded information relating to the state of the game through a common communication network, such as a telephone line.

By way of a first example, in U.S. Pat. No. 4,372,558 entitled "Remote Gaming Apparatus" and issued to Shimamoto et al. on Feb. 8, 1983, each player has a dedicated game apparatus for detecting and displaying the position of game pieces (i.e., chess pieces). Each dedicated gaming apparatus has communications hardware for transmitting and receiving over the phone system coded information relating to the position of the game pieces. In this manner, each dedicated gaming apparatus displays the current position of the game pieces as effected by both players.

The apparatus disclosed by '558 patent does not identify the players or enable the players to communicate with each other while playing the game. Further, not only must each player input their game moves, but they must also manually move game pieces on a game board.

By way of a second example, U.S. Pat. No. 5,186,471 entitled "Interactive Telephone Gaming System" and issued to Vancraeynest on Feb. 16, 1993, discloses a gaming apparatus for use with a telephone network which supports standard dual tone multi-frequency (DTMF) signals. One or more players use a modified telephone station to play a game with a network gaming apparatus by receiving a sequence of DTMF tones and replicating the same sequence DTMF tones by pressing tone keys that correspond to the received sequence of DTMF tones. Each tone key has a corresponding light emitting diode (LED) which illuminates in response to receiving a corresponding DTMF signal from the network gaming apparatus. The illumination of the LEDs provide visible cues to the player at the modified telephone station to assist the player in matching the auditory pattern of DTMF tones generated by the network gaming apparatus.

The apparatus disclosed by the '471 patent does not identify players, nor does it enable play or communications between two or more players.

By way of a third example, U.S. Pat. No. 5,273,288 entitled "Communication Terminal Used As A Game Machine" and issued to Teshima et al. on Dec. 28, 1993, discloses a communication terminal for playing a game with an opponent through a telephone line. The communication terminal comprises a push button type telephone connected parallel to the communication terminal so that a voice signal of the push button type telephone is simultaneously transmitted to the opponent with a PB signal and a position signal. Accordingly, it is possible to talk with an opponent during game play.

By way of a fourth example, U.S. Pat. No. 6,080,064 entitled "Device For Playing Games Via A Communications Network, And A Game System Using A Communications Network" and issued to Pieterse et al. on Jun. 27, 2000, discloses apparatus using a pointing device such as a joystick or the keys of a telephone set to generate DTMF pointing signals. Pieterse also discloses using the keys of a telephone set to transmit game instructions, such as "Fire", "Start", "Stop" and "Hold".

The apparatus disclosed by the '288 and '064 patents do not clearly identify and differentiate between players and their respective game moves, nor do they enable the display and identification of each player's moves on a modified keypad located at each of a plurality of communication terminals participating in game play.

Although known remote gaming systems succeed in providing entertainment to remotely located game players, they pose a problem in that they often require specialized apparatus, in addition to a telephone that shares a telephone line with the apparatus. Further, it is difficult to identify who made which move and whose turn it is, especially for a game played by a plurality of players.

Computer games, played via a server located in a telephone network or over the Internet, normally require the user to subscribe to a service and/or pay to play a game. For such games, it is difficult to set up a game with a known opponent. Often, game players are playing alone or against a computer. In other cases, players participating in game play do not know who their opponents are, and thus the personal interaction with friends and family members is lost. Further, such games do not allow parties having a conversation to spontaneously play a game by placing their communication devices in a game mode.

It is therefore an object of the present invention to incorporate a compact gaming system into a communication terminal, such that parties having a conversation can initiate game play without interfering with an ongoing conversation or having to connect additional equipment to their telephone lines.

It is a further object of the present invention to display at each terminal participating in a game, the identities of each player and to identify each player's game moves in a clear and compact manner.

SUMMARY

In accordance with the principles of the present invention, the above and other objectives are realized in an apparatus and method for simultaneously indicating on each of a plurality of communication terminals, instructions transmitted by each terminal and the identity of the respective terminals that transmitted the instructions. Such a feature can be used to indicate the moves of parties playing a game over a telephone line. Once a party indicates a game move, the party is prohibited from making any additional moves until after the other party makes a move. The present invention can also be incorporated into wireless telephones (e.g., cellphones), walkie talkies, wireless toys and other types of transceivers.

More particularly, once a communications link (e.g., wired, wireless, etc.) is established between two or more parties, their terminals are placed in a game mode which activates inband signal detection circuitry located within the terminals. Multi-colored indicators (e.g., LEDs and/or LCDs)

at each terminal are activated, their color being dependent upon the source of received instructions.

In a first embodiment of the invention to be described hereinafter, the telephone number of each player is displayed on a corresponding LCD. Additionally, one of a plurality of LEDs next to each LCD is illuminated in a color representing the player associated with the displayed telephone number. An LED blinking next to a particular player's displayed telephone number indicates that it is that player's turn to go.

In a second embodiment of the invention to be described hereinafter, player identification indicators may be incorporated into a touch tone keypad located on the terminals. The keypad's touch tone keys are modified such that each has two or more color coded LEDs incorporated within, each color representing a particular player's move. Thus, besides providing a means for dialing telephone numbers and transmitting DTMF tones, the touch tone keys can represent a game board and/or game accessory when the terminal is placed in a game mode. For example, a 3 by 3 matrix formed by touch tone keys numbered 1 through 9 on a touch-tone pad of a communication terminal may be modified to contain two different colored indicators which light up in accordance with a particular party's move. The 3 by 3 matrix can be used to play tic-tac-toe over a telephone line. The activation of three LEDs of the same color in a row, column or diagonal will cause those LEDs to blink on each terminal, signifying the end of the game. Of course, the game tic-tac-toe is an elementary game, and the invention could be used for numerous other games (e.g., battleship, checkers, chess, etc.) by expanding the functionality of the touch-tone pad. Also, the invention could be expanded to incorporate games played by more than two players.

In a third embodiment of the invention to be described hereinafter, the indicators are installed on a gaming board which is extended (e.g., a spring loaded gaming board) from the base of the terminal, or inserted into an auxiliary card slot on the terminal. The color of the indicators clearly identify which instructions were sent by each party.

In a fourth embodiment of the invention to be described hereinafter, the indicators may be incorporated into a keypad consisting of one or more liquid crystal displays (LCDs) or a touch panel which normally displays the symbols of a touch tone telephone and, when a game mode is activated, the symbols change to game status indicators (e.g., game pieces).

DETAILED DESCRIPTION

The present invention is an apparatus and method for simultaneously indicating on each of a plurality of communication terminals, game move selections transmitted by each terminal and the identity of the respective terminals and/or players that transmitted the game move selections. Further, the present invention tracks and indicates whose turn it is to input a game move selection. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
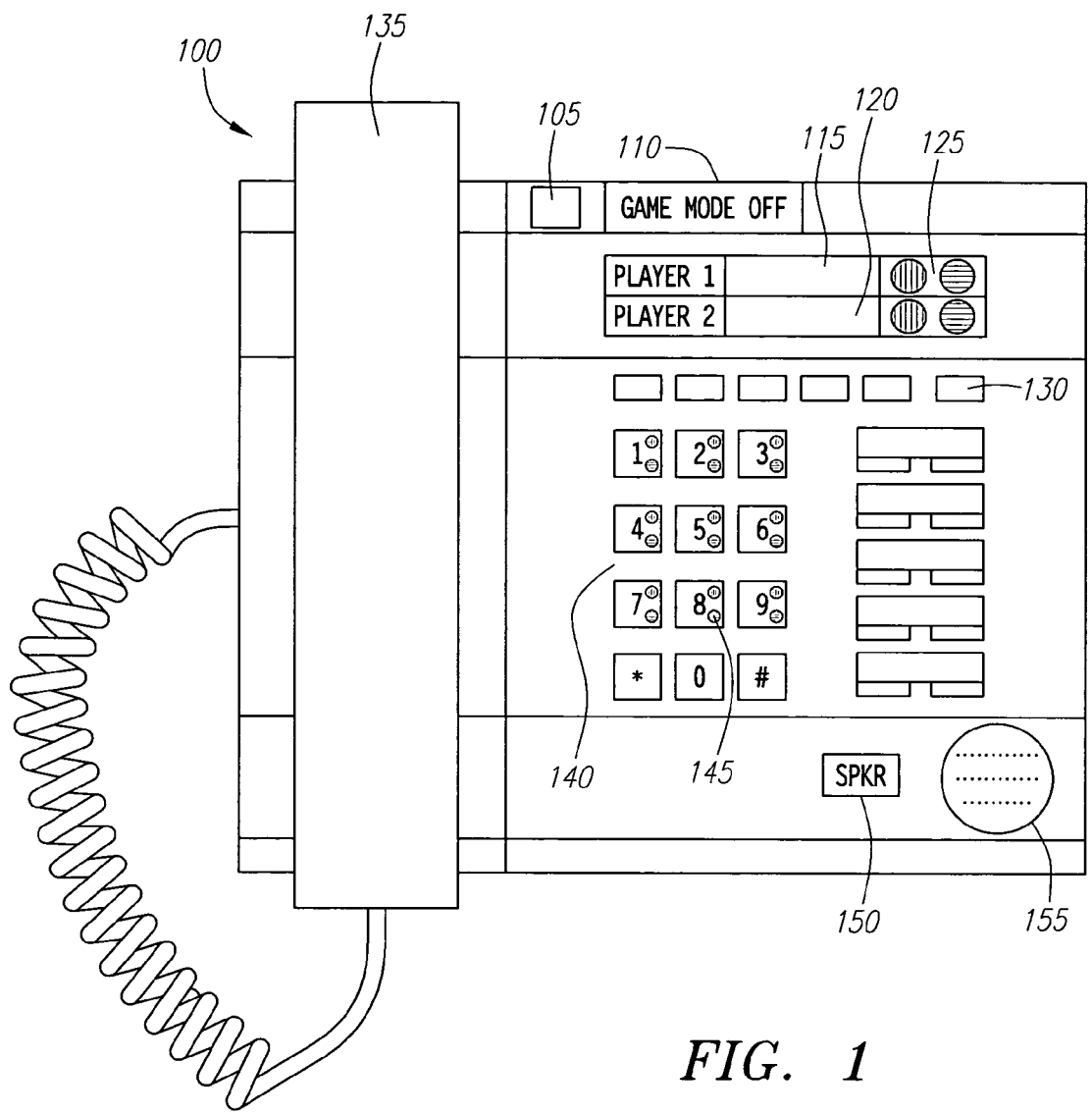
FIG. 1 illustrates a speakerphone terminal with its game mode deactivated in accordance with the present invention.

Referring now to FIG. 1, a speakerphone terminal 100 with its game mode deactivated in accordance with the present invention is illustrated. Speakerphone terminal 100 includes a handset 135, an external speaker activator 150 and an external speaker 155, such that a user can carry out a conversation with another party without having to hold handset 135. Speakerphone terminal 100 is capable of placing telephone calls by using keypad 140 to dial telephone numbers, and is also capable of receiving telephone calls in a manner known to one of ordinary skill in the art. Once a communications link with another party has been established, the user of speakerphone terminal 100 can activate a game mode at any time. In accordance with the present invention, speakerphone terminal 100 comprises a game mode activator 105 and game mode state display 110, which are shown in a deactivated (off) state. Further, speakerphone terminal 100 includes player identification displays 115 and 120, and game player key identifier 125. The player identification displays 115 and 120 comprise LCDs. The game player key identifier 125 comprises a plurality of color coded LEDs. When speakerphone terminal 100 is first installed at a particular location, the telephone number to be associated with speakerphone terminal 100 is permanently stored in memory by the user until the number is changed (e.g., due to relocation). Memory storage key 130 is activated to enable storage of the terminal's telephone number. Some or all of the keys in keypad 140 contain game move indicators 145 consisting of a plurality of color coded LEDs. When the game mode is off, displays 115 and 120 are deactivated, as well as the game player key identifiers 125 and all game move indicators. The game playing circuitry of the present invention may be powered by a battery within speakerphone terminal 100, an external power source (e.g., AC power), or powered from the telephone line. Because not all established calls will be for the purpose of playing games, the game mode feature has been incorporated as a way of conserving power.

Figure 2:
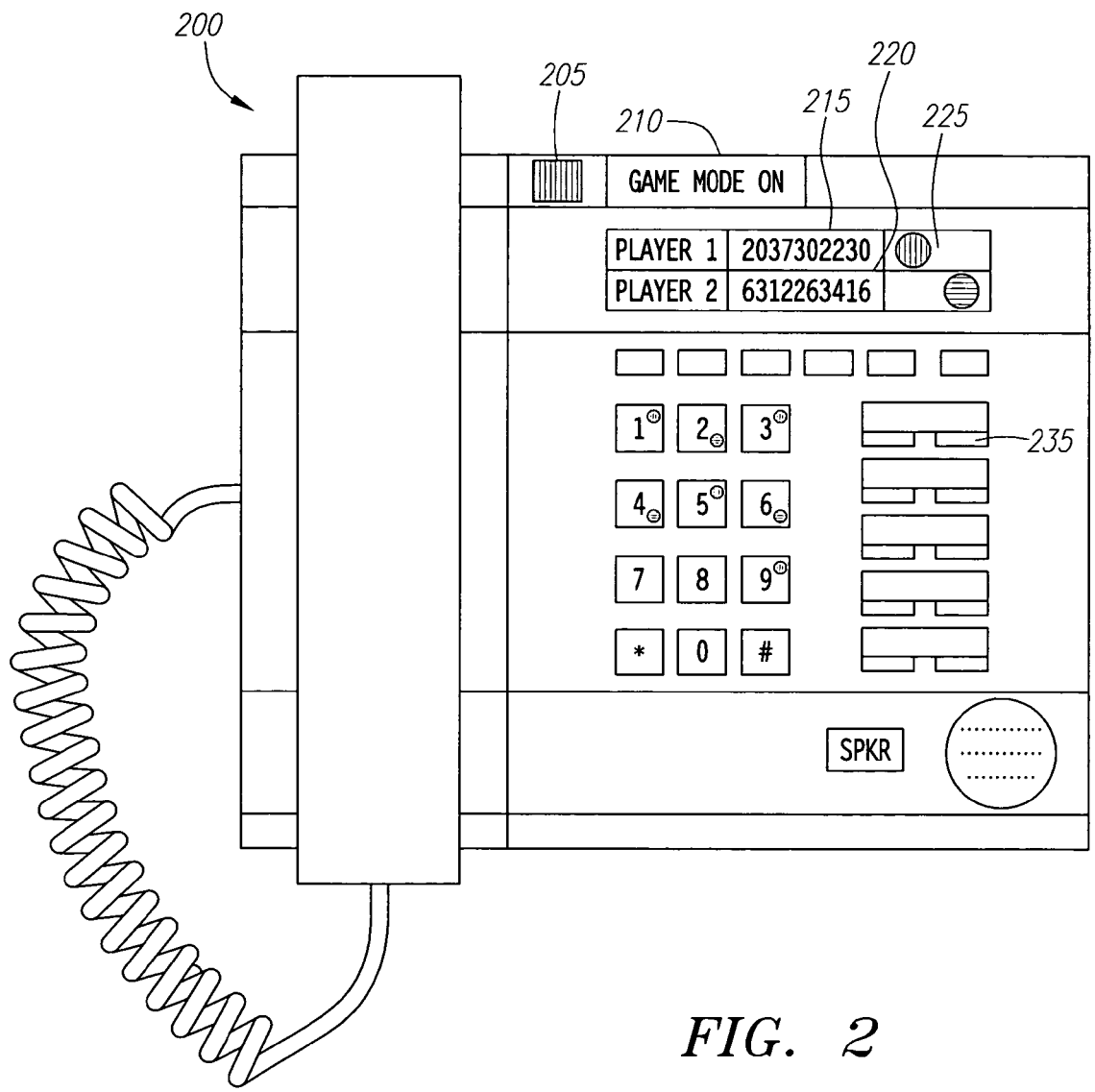
FIG. 2 illustrates a speakerphone terminal with its game mode activated in accordance with the present invention.

Referring now to FIG. 2, a speakerphone terminal 200 with its game mode activated in accordance with the present invention is illustrated. Speakerphone terminal 200 comprises a game mode activator 205 and game mode state display 210, which are shown in an activated (on) state. Speakerphone terminal 200 includes player identification displays 215 and 220 which contain game player telephone numbers and game player key identifier 225. After a communications link with another terminal is established, the user of speakerphone terminal 200 depresses game mode activator 205. Assuming that the other party of the communications link has similar gaming apparatus, the game mode of the other party's terminal may be activated in response to an inband signal transmitted in response to depressing activator 205, or both player's may both activate their game modes. One player is identified as "Player 1", telephone number 2037302230 and assigned a first color (e.g., red) by game player key identifier 225. The other player is identified as "Player 2", telephone number 6312263416 and assigned a second color (e.g., blue). Telephone numbers could be automatically translated into player names by scanning a translation database, if such a feature was desired by a designer of the terminal. As an optional embodiment, one or more special feature buttons 235 can be depressed to change (swap) player, color identifiers and to override player move authorizations regarding which player goes first. Once the game mode is activated, one of the player's is authorized to make the first game move as indicated by which colored LED of the game player key identifier 225 is sequentially turning on and off (e.g., blinking). The authorized player then inputs a game move by depressing one or more keys on the player's terminal keypad. As shown, the results of a completed game of tic-tac-toe are displayed on each terminal user's keypad. Note that player 1 won because keys 1, 5 and 9 were selected, thus completing a diagonal on a three by three matrix (keypad keys 1 through 9). The winner may be indicated by causing the three illuminated LEDs on the diagonal to blink on and off.

Figure 3:
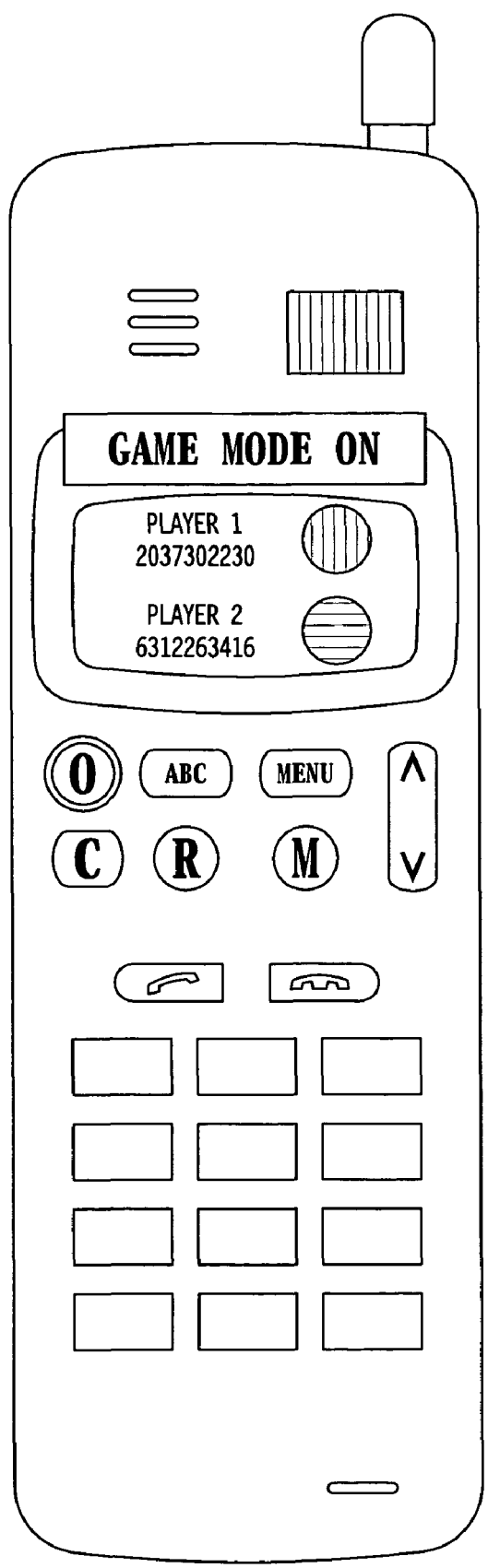
FIG. 3 illustrates a wireless terminal with its game mode activated in accordance with the present invention.

Referring now to FIG. 3, a cellular (wireless) telephone is illustrated in accordance with the present invention. In this configuration, the identities of the players, their associated telephone numbers and their assigned colors are conveyed on a single display.

Figure 4:
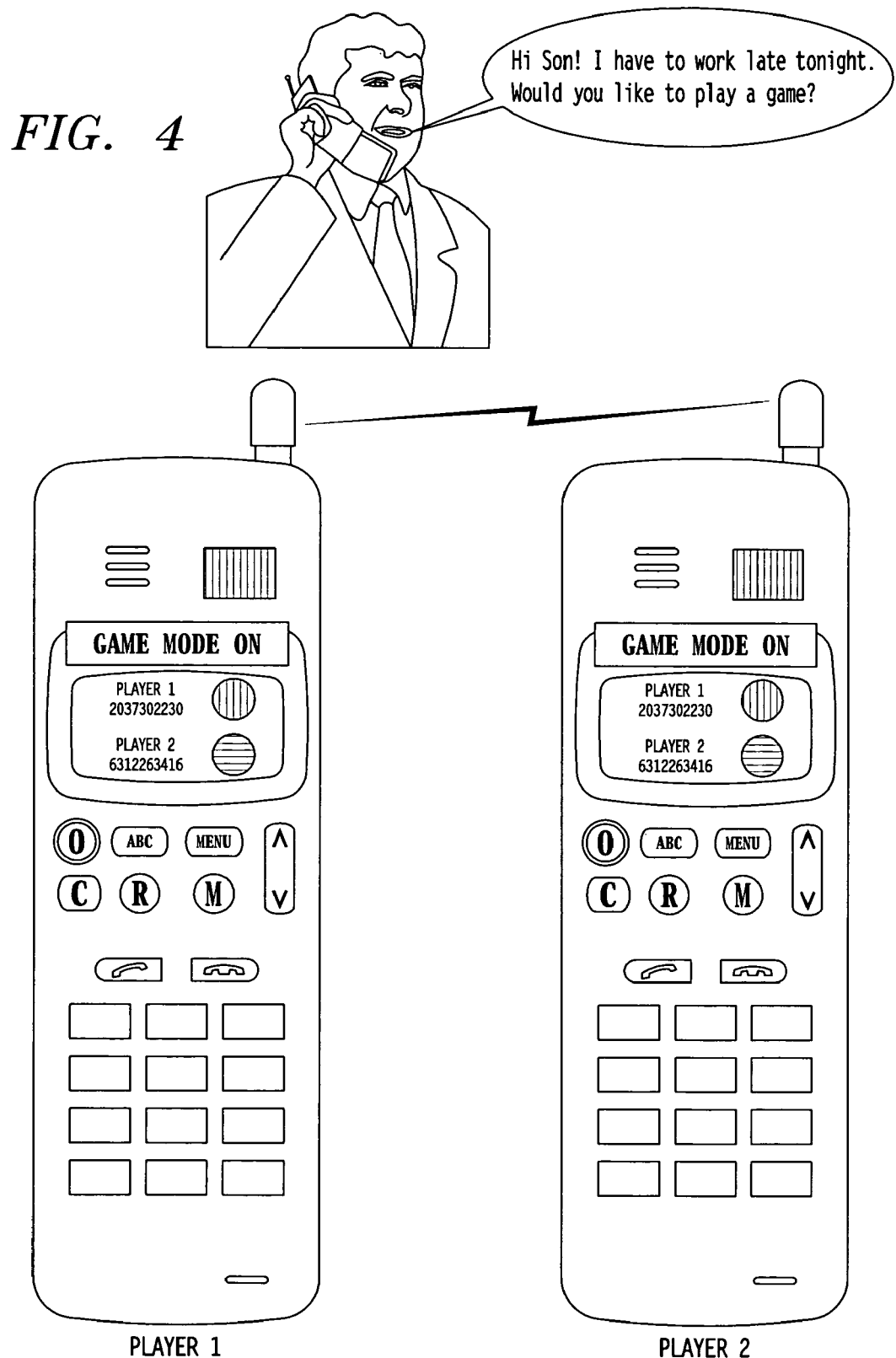
FIG. 4 illustrates use of a plurality of wireless terminals for spontaneous game playing during an ongoing conversation in accordance with the present invention.

Referring now to FIG. 4, wireless communication between two players is illustrated in accordance with the invention. The features afford compact and portable game playing features. For example, Scott calls his 10 year old son Bobby and informs Bobby that he will have to work late. Both Scott and Bobby are equipped with a wireless communication terminal in accordance with the present invention. During their conversation, Scott asks Bobby, "would you like to play a game of tic-tac-toe?" Bobby agrees. Scott and/or Bobby energize a "game mode" button on their devices. Before doing so, the devices performed as standard cellphones. Upon activating the game mode, an LCD displays the telephone numbers of Scott (player 1) and Bobby (player 2) and assigns colors (identifiers) used to differentiate between each player (e.g., red for Scott and blue for Bobby). The flashing of a red colored LED next to Scott's telephone number on each device indicates that it is Scott's turn to go first. Scott enters a game move by depressing one or more push buttons on his terminal. Thus he conveys one or more instructions to both terminals. The instructions are processed in each of Scott's and Bobby's devices by pre-programmed microprocessors (e.g., CPUs) which control all functions of each terminal's game mode. Scott and Bobby continue playing the game by taking turns inputting game moves (instructions) until the game ends.

Figure 5A:
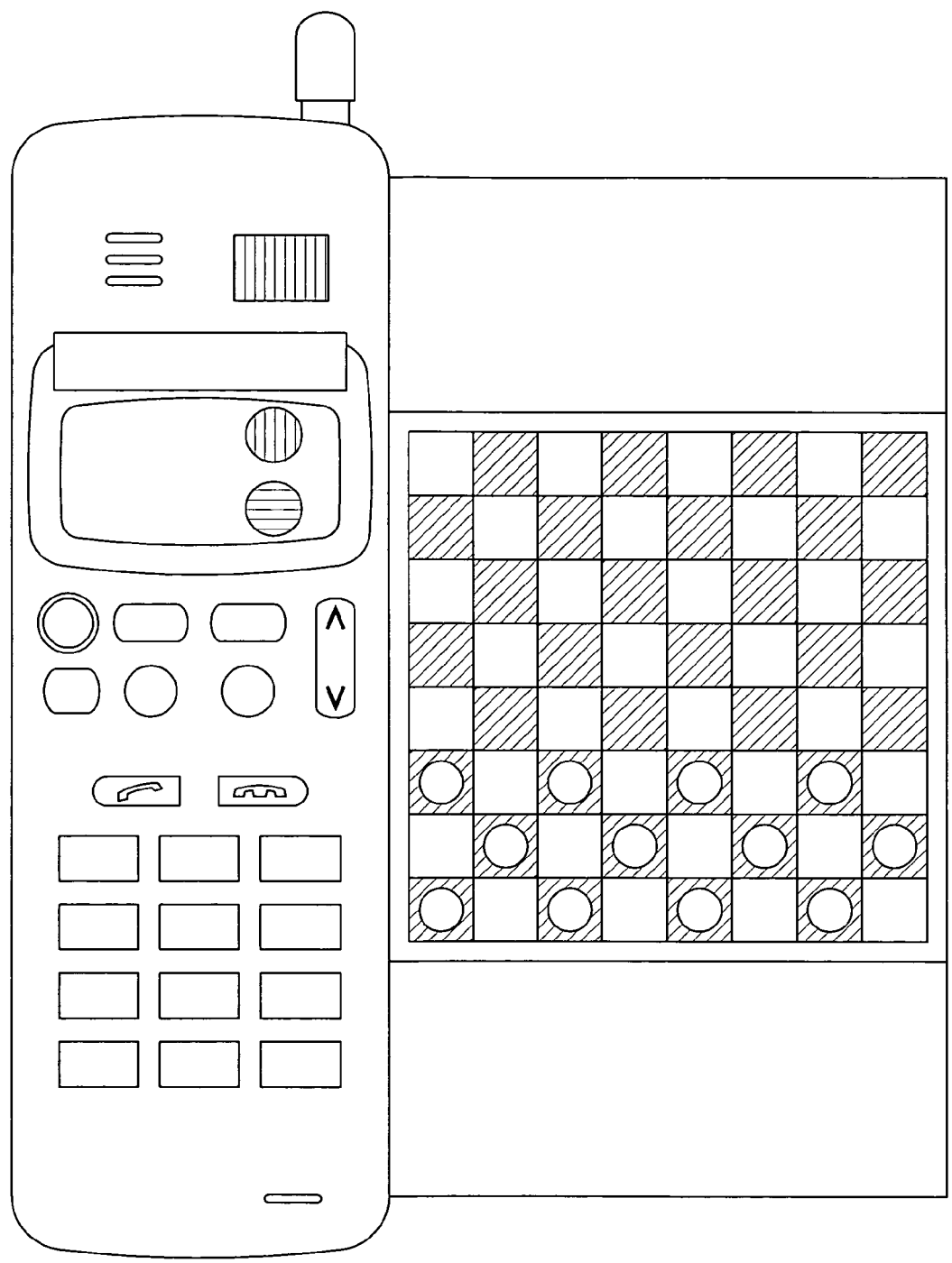
FIGS. 5A and 5B illustrate auxiliary game cards/modules inserted into an auxiliary card slot of a wireless terminal in accordance with the present invention.
Figure 5B:
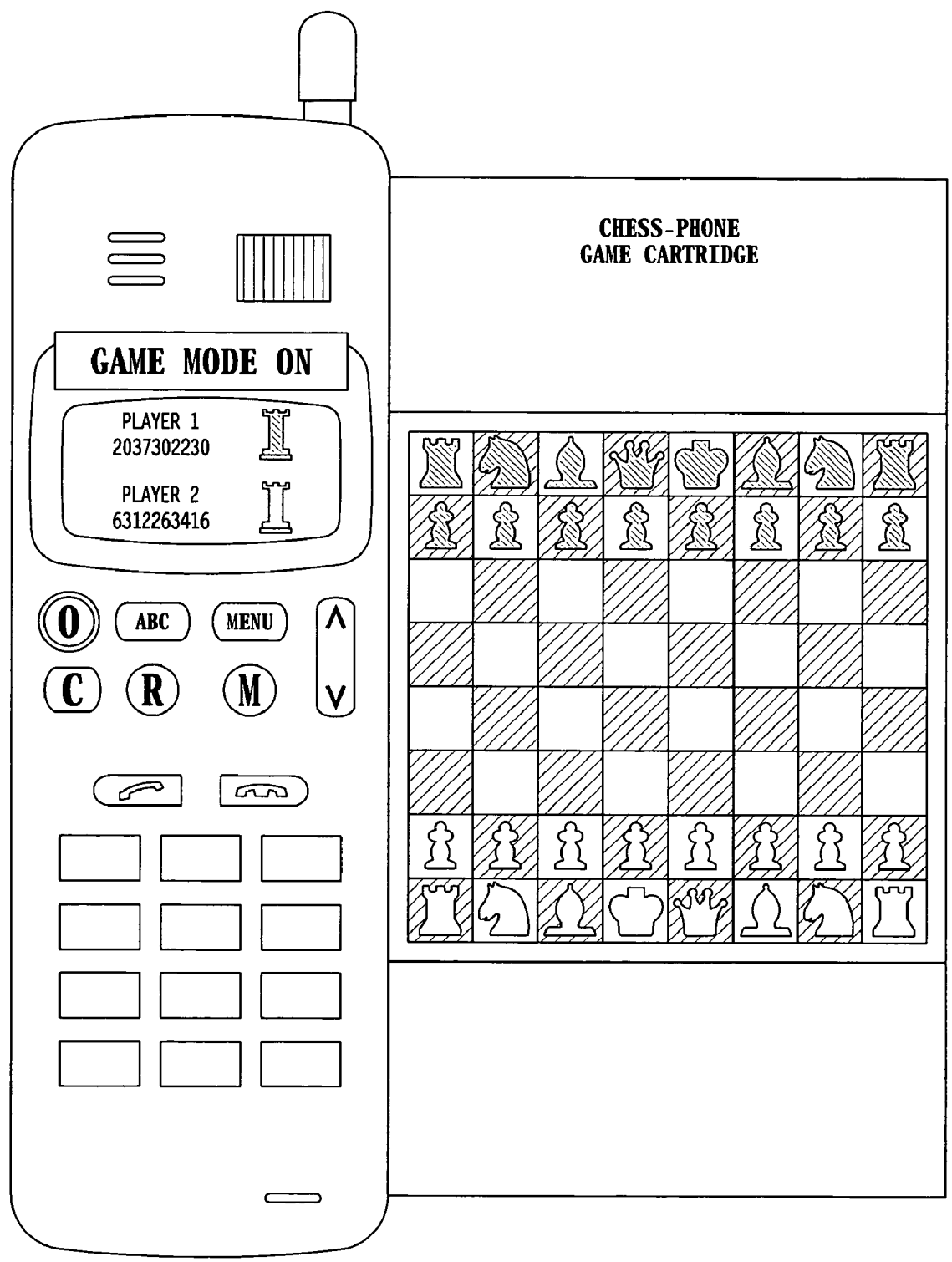

Referring now to FIGS. 5A and 5B, auxiliary game cards/modules can be inserted into a wireless communication terminal in accordance with the present invention. Auxiliary game cards provide additional software, features and functions that go beyond the capabilities of the base communication terminal.

Figure 6:
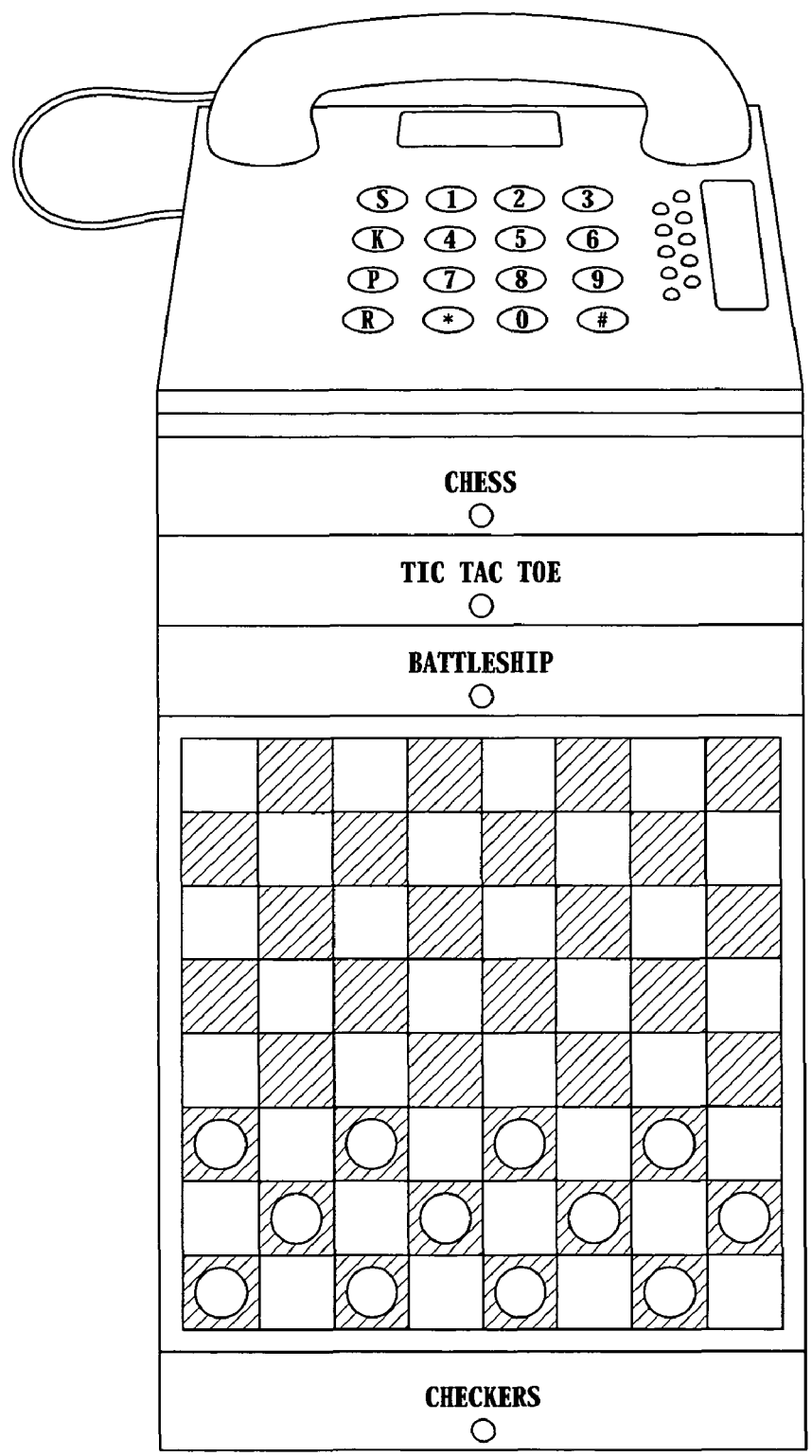
FIG. 6 illustrates a terminal comprising a plurality of digital gaming boards, one being extended for play in accordance with the present invention.

Referring now to FIG. 6, a terminal containing multiple game boards inserted into its base is illustrated in accordance with the present invention. The game boards can be pulled out as desired, or they can be spring loaded and pop out when a button on the game is depressed. Ribbon cable can be used to connect the circuitry from the individual game boards to the terminal Each of these game boards provide specialized software and functions to play a particular game.

Figure 7:
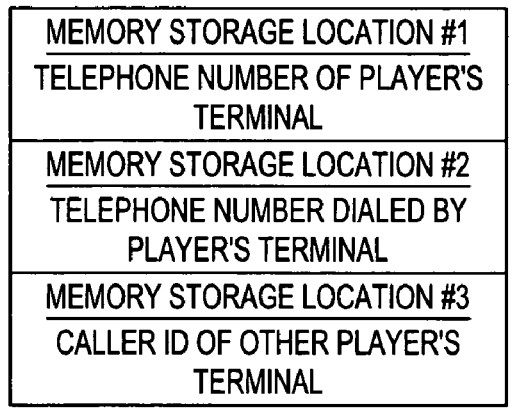
FIG. 7 illustrates logic used for displaying game player IDs at each player's terminal in accordance with the present invention.
Figure 7:
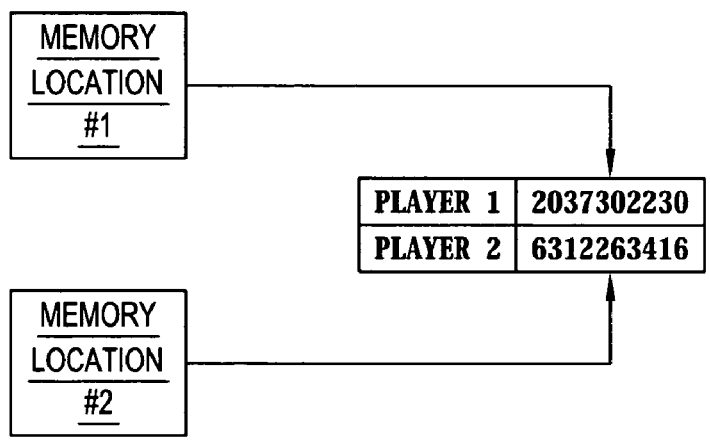
Figure 7:
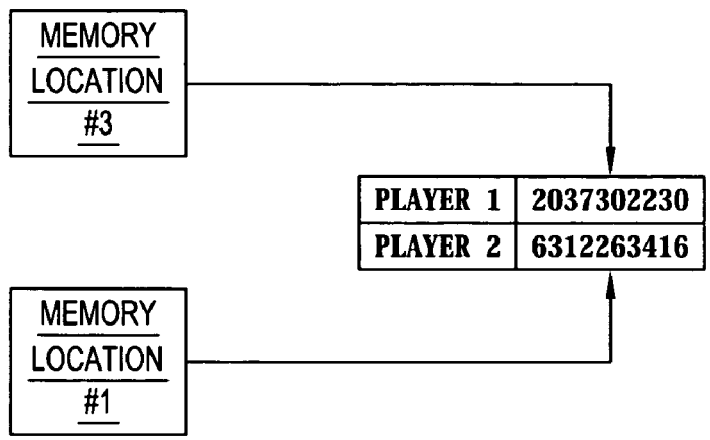

Referring now to FIG. 7, the logic for displaying player IDs at each player's terminal is illustrated. Each terminal contains three memory locations dedicated to storing the telephone number of the user's terminal (memory storage location #1), the dialed telephone number (memory storage location #2) and the caller ID of another player's terminal (memory storage location #3). If a player originates a communications link to another player (placed an outgoing call), the telephone numbers in memory storage locations #1 and #2 are promptly displayed on each terminal once a game mode is activated. If a player receives a call, the telephone numbers in memory storage locations #1 and #3 are promptly displayed on each terminal once a game mode is activated.

Figure 8A:
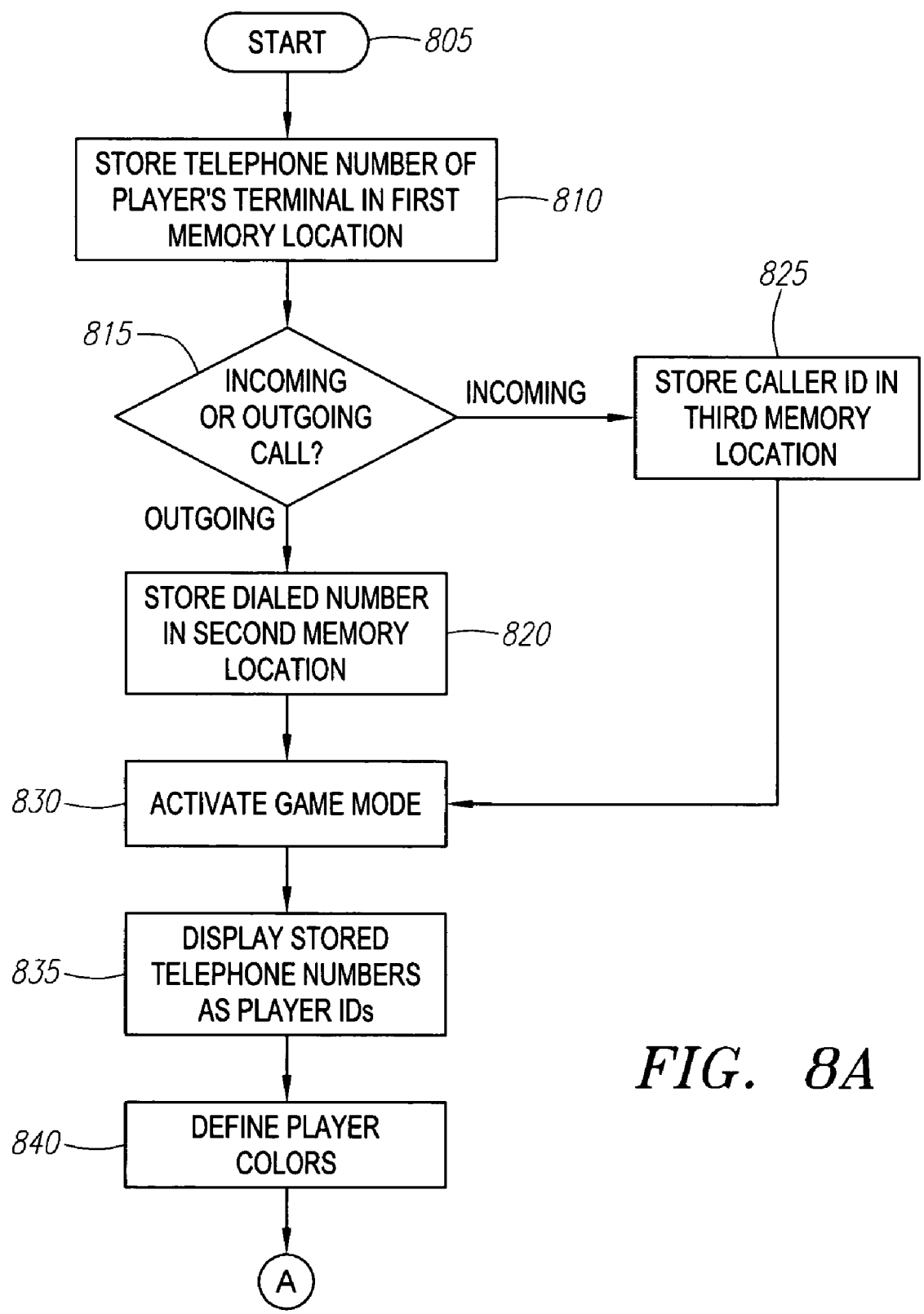
FIGS. 8A and 8B illustrate a method flow chart in accordance with the present invention.

Referring now to FIG. 8A, a flow chart of a method implemented by the present invention is illustrated. The method is initiated at step 805. When a terminal incorporating the features of the present invention is first used, the user is instructed to store the terminal's telephone number in a first memory location within the terminal (step 810). As long as the terminal's telephone number remains unchanged, the first memory location retains the telephone number. The terminal operates as a complete communications device, whether it be a cellular phone, a speakerphone, a telephone or a computer. When a communication is established over a common communications link (wired or wireless) with another terminal, a determination is made as to whether the terminal initiated the communication (e.g., such as by placing an outgoing telephone call) or received the communication (such as by receiving an incoming telephone call) (step 815). If it is determined that the communication was initiated by the terminal, the address used to initiate the communication (e.g., dialed number) is stored in a second memory location (step 820). If it is determined that the communication was initiated by a different terminal, the address of the different terminal is determined (e.g., such as by using caller ID or manually inputting identifying information) and stored in a third memory location (step 825). Other terminals connected to the communications link do not need to incorporate the features of the present invention in order to carry out communication between the terminals. However, if the terminals incorporate the features of the present invention, the users of the terminals may spontaneously decide to play a game at any time during an ongoing conversation by having one or more of the users activate a "Game Mode" option on their terminals (step 830). Upon such activation, the addresses of terminals communicating over the communications link are promptly displayed on each terminal (step 835). The terminals may be programmed to always designate the original calling (initiating) party as "Player 1" and designate the called (receiving) party as "Player 2". Identifiers are then defined for each terminal by assigning a color to represent their upcoming game move selections, and to differentiate between the different players' moves (step 840).

Figure 8B:
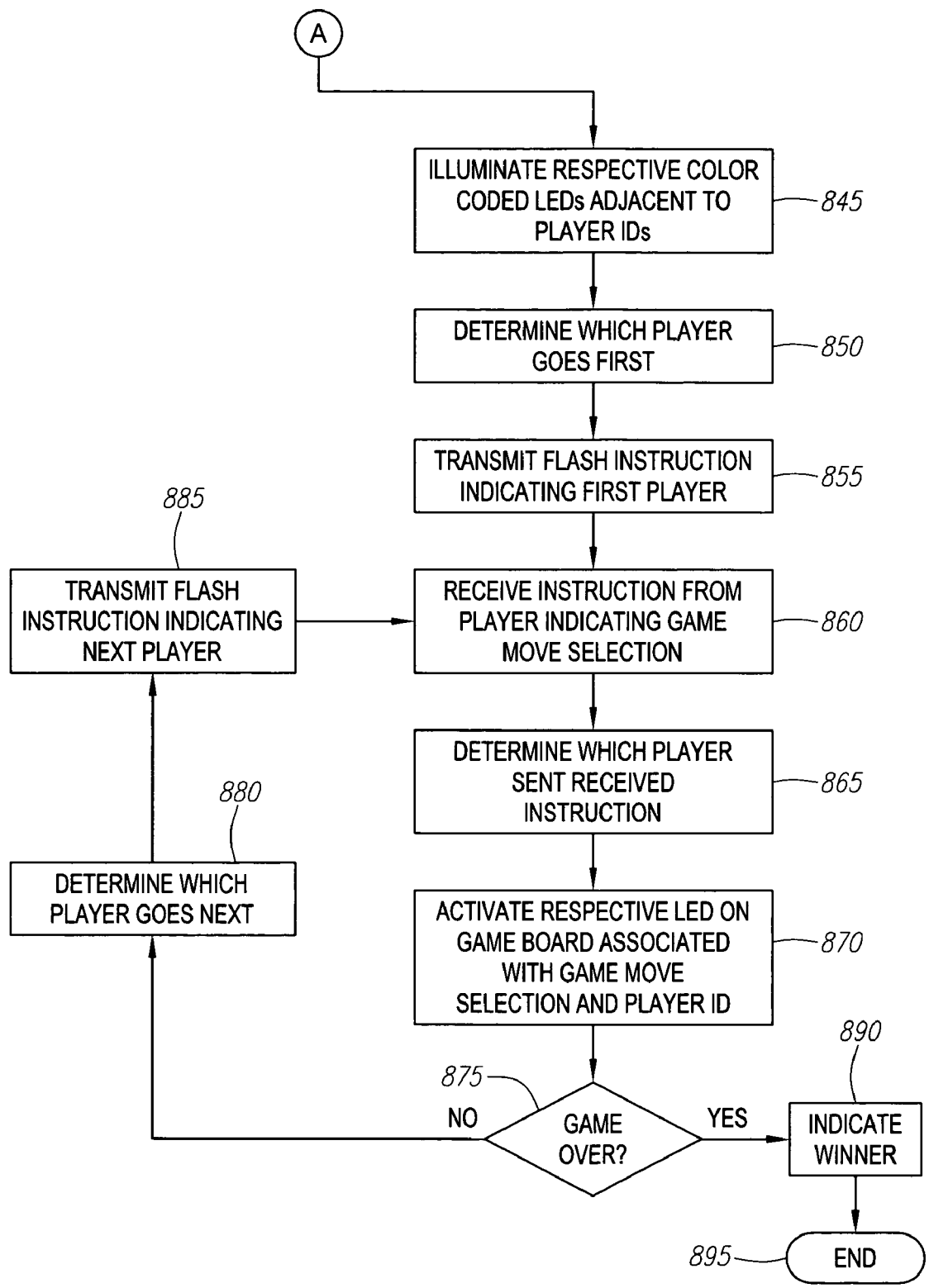

Referring now to FIG. 8B, a colored LED is illuminated next to Player 1's telephone number, and a second colored LED is illuminated next to Player 2's telephone number on each player's terminal (step 845). A determination is then made as to which player goes first (step 850). Such a determination can be based upon which player placed the call (Player 1 would go first), or by providing an input means for selecting which player goes first. Upon determining which player goes first, one of the illuminated LEDs (player identifiers) on each terminal flashes next to the Player's ID in response to a "turn flash" instruction (step 855). It would then be Player 1's turn to input a game move selection on his or her terminal. Upon Player 1's input, an instruction indicating a game move selection is received at both terminals (step 860). Upon receipt of the instruction, the flashing LED ceases to flash and a determination is made as to which terminal sent the instruction (step 865). Then Player 1's move is represented by illuminating a color coded LED corresponding to the move on a game board incorporated at each player's terminal (step 870). A determination is then made as to whether the game is over (e.g., did a player win?) (step 875). If it is determined that the game is not over, a determination is made as to which player is to make the next move (step 880). Upon such determination, again one of the illuminated LEDs on each terminal flashes next to the next Player's ID in response to another "turn flash" instruction (back to step 885). The game proceeds in such a fashion until it is determined that the game is over (step 875). An indication of the winner is conveyed on both terminals (step 890). The game then ends (step 895).

Figure 9:
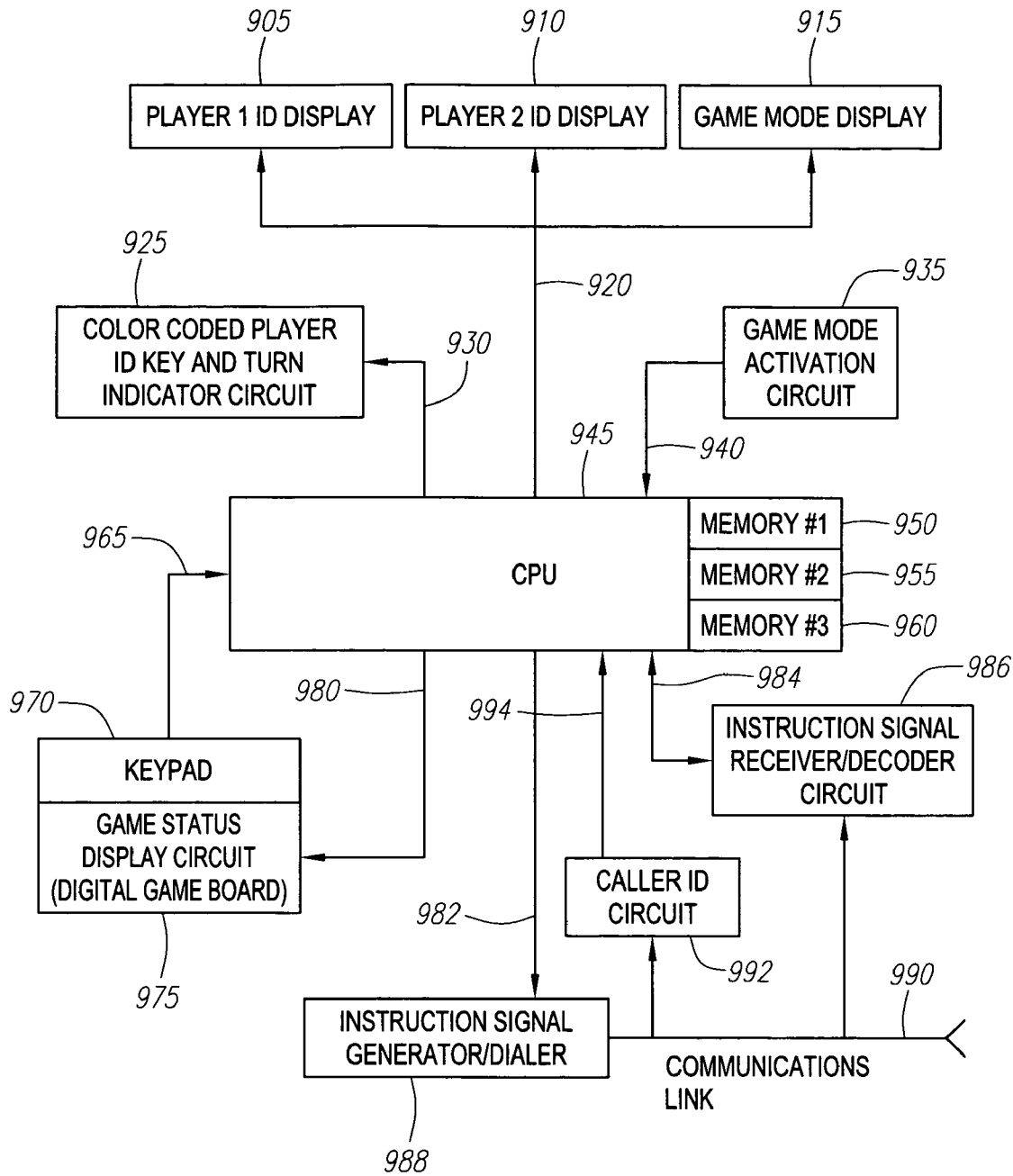
FIG. 9 discloses a block diagram of terminal circuitry used in accordance with the present invention.

FIG. 9 illustrates terminal circuitry used to implement the present invention. Upon initial use of the terminal, the user is instructed to input the terminal's address (e.g., telephone number) on keypad 970. Via path 965, the address is received by CPU 945 and permanently stored in a first memory location 950. When a communication is initiated by the user, the user inputs a called terminal's address on keypad 970. Via path 965, the address is received by CPU 945 and temporarily stored in a second memory location 955. The call is placed by instruction signal generator/dialer circuit 988 which receives dialing instructions from CPU 945 via path 982. A communication is then established over common communications link 990 with another terminal. When a communication is received from a different terminal via communications link 990, the address of the other terminal is processed by caller ID circuit 992, forwarded to CPU 945 via path 994 and temporarily stored in third memory location 960. During an ongoing conversation, one of the users may activate a "Game Mode" option on their terminals which causes game mode activation circuit 935 to instruct CPU 965 via path 940 to activate Player 1 and Player 2 ID displays 905 and 910 via path 920, and to change game mode display 915 to visually indicate that the game mode is activated. Upon such activation, the addresses of terminals communicating over the communications link are retrieved from memories 950, 955 and/or 960 and are promptly displayed. Additionally, color coded player ID key and turn indicator circuit 925 is activated by CPU 945 via path 930, which illuminates a first colored LED next to Player 1's address and a second colored LED next to Player 2's address on each player's terminal. One of the illuminated LEDs (player identifiers) on each terminal flashes next to the Player's ID in response to a "turn flash" instruction generated by CPU 945. All game move signals received from another terminal are received over communications link 990 and are processed by instruction signal receiver/decoder circuit 986 and forwarded to CPU 945 via path 984. The CPU 945 keeps track of whether the terminal within which the CPU 945 resides sent a game move, or whether an external terminal sent a game move. The instruction signal receiver/decoder circuit is controlled by CPU 945 such that it only processes signals received from outside the terminal. CPU outputs game moves via path 980 to game status display circuit 975, and to keypad 970 if the game moves are to be displayed on the keys of keypad 970.

Figure 10:
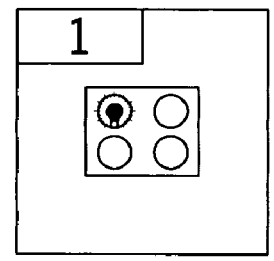
FIG. 10 illustrates a keypad configuration used to select and display game moves by illuminating multiple color coded LEDs located within keys of the keypad in accordance with the present invention.
Figure 10:
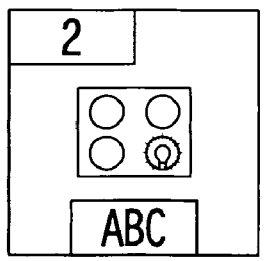
Figure 10:
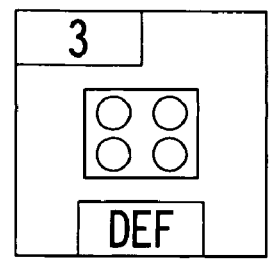
Figure 10:
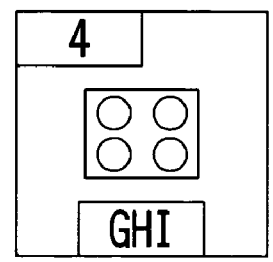
Figure 10:
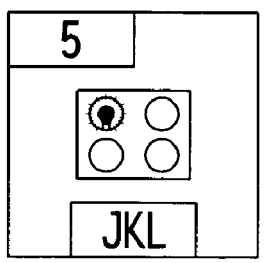
Figure 10:
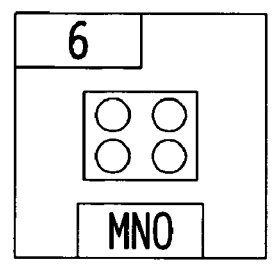
Figure 10:
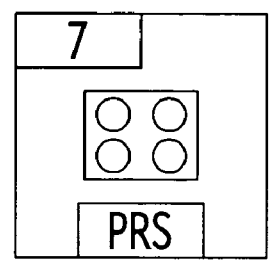
Figure 10:
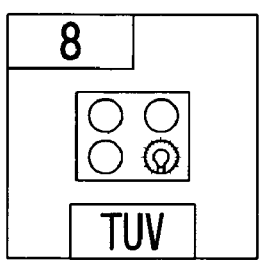
Figure 10:
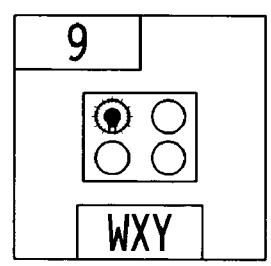
Figure 10:
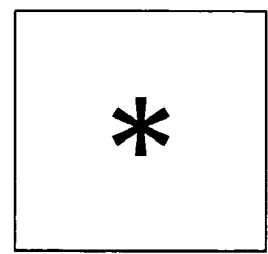
Figure 10:
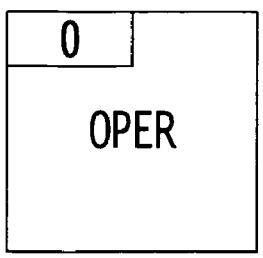
Figure 10:
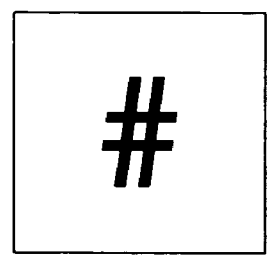

Referring to FIG. 10, a keypad layout in accordance with the present invention is illustrated. Each key position numbered 1 through 9 can contain up to four different colored LEDs. Only one LED in each key can be illuminated at a time.

Figure 11:
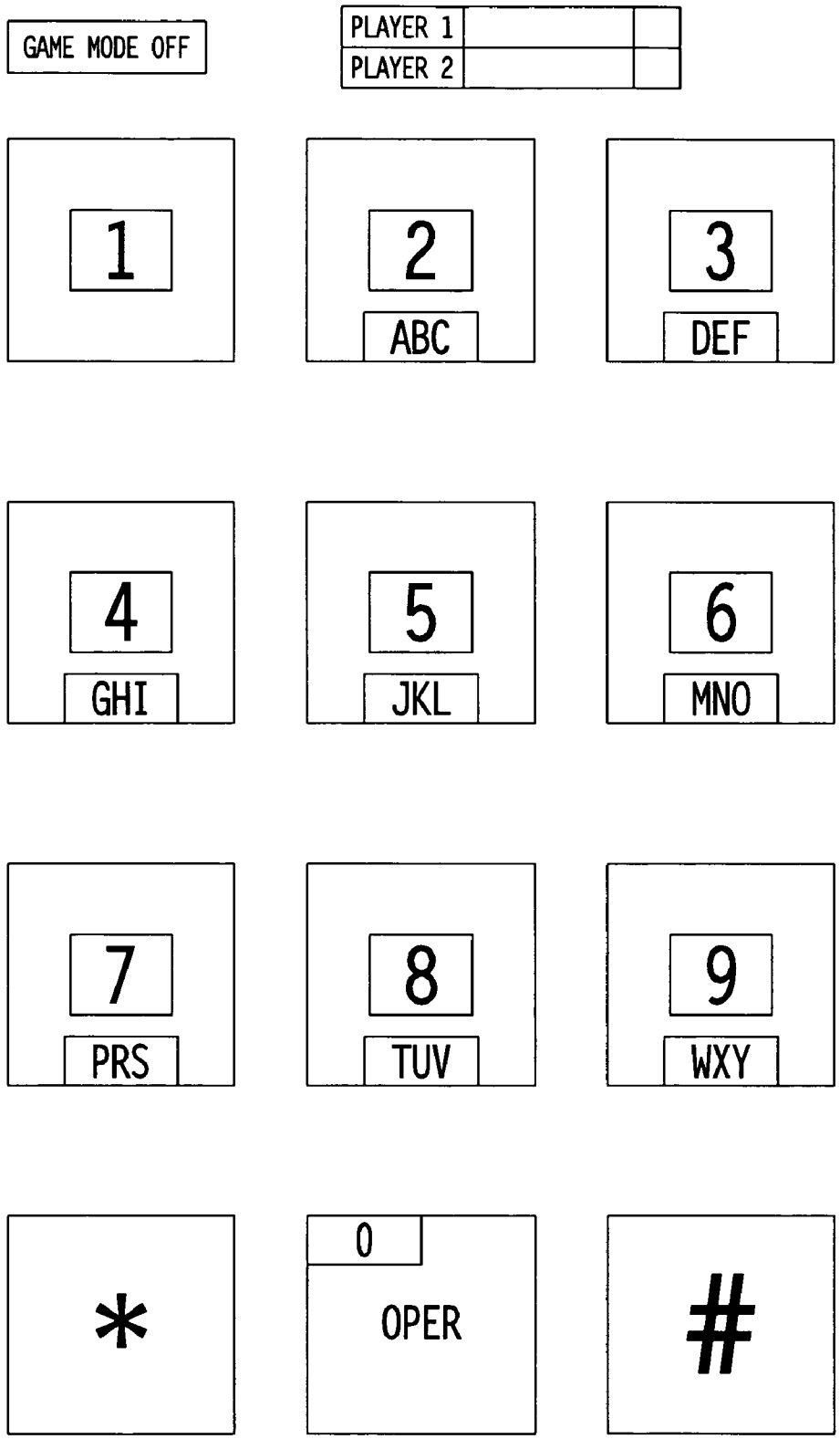
FIG. 11 illustrates a keypad configuration comprising a plurality of LCDs, wherein numbers corresponding to each key on the keypad numbered 1 through 9 are displayed prior to activation of the game mode in accordance with the present invention.

Referring to FIG. 11, another embodiment of a keypad layout in accordance with the present invention is illustrated. Each key position numbered 1 through 9 can contain an LCD which displays the number of the key when the game mode is off.

Figure 12:
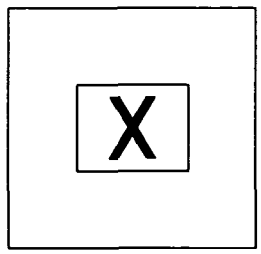
FIG. 12 illustrates a keypad configuration comprising a plurality of LCDs, wherein game moves corresponding to each key on the keypad are displayed during a game initiated after the activation of the game mode in accordance with the present invention.
Figure 12:
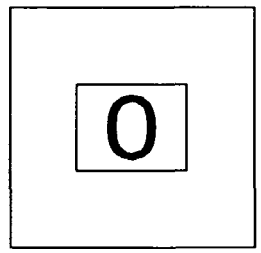
Figure 12:
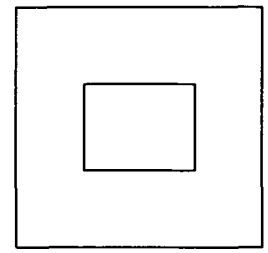
Figure 12:
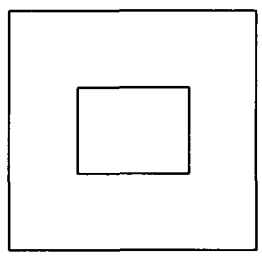
Figure 12:
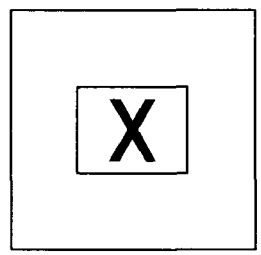
Figure 12:
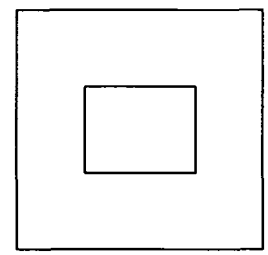
Figure 12:
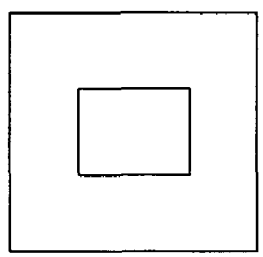
Figure 12:
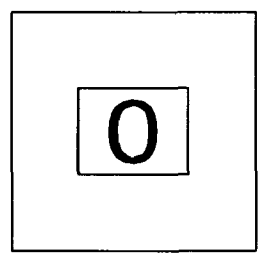
Figure 12:
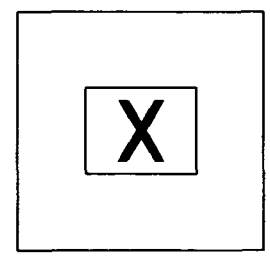
Figure 12:
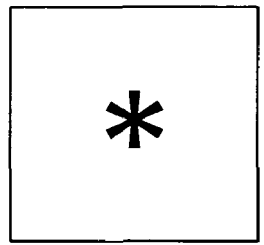
Figure 12:
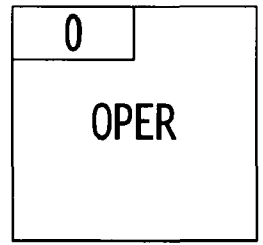
Figure 12:
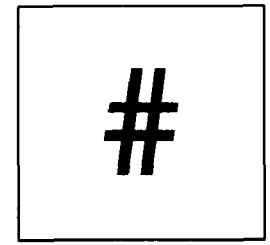

Referring to FIG. 12, the key displays shown in FIG. 11 go blank when the game mode is activated, and as a game progresses, game pieces are displayed on the keys. In the case of tic-tac-toe, X's and O's are displayed in accordance with the players inputs.

It should be noted that the method and apparatus described herein has been illustrated as supporting communications and game play between only two game players. However, it is understood that the invention can be dimensioned to concurrently support more than two players.

An apparatus and method for simultaneously indicating on each of a plurality of communication terminals, instructions transmitted by each terminal and the identity of the respective terminals that transmitted the instructions is described herein. These specific arrangements and methods described herein are merely illustrative of the principles of the present invention. Numerous modifications in form and detail may be made by those of ordinary skill in the art without departing from the spirit and scope of the present invention. Although this invention has been shown in relation to a particular embodiment, it should not be considered so limited. Rather, the present invention is limited only by the scope of the appended claims.

I claim:
1. An apparatus, comprising:
    means for receiving a phone number associated with a communication terminal, wherein the means for receiving comprises a plurality of keys, and wherein each of the plurality of keys comprises an indicator of a first color and an indicator of a second color;
    means for entering into a game with the communication terminal, wherein the means for entering is configured to enter into the game with the communication terminal in response to the phone number associated with the communication terminal being received by the means for receiving;
    means for displaying an identifier of the apparatus in the first color and for displaying an identifier of the communication terminal in the second color; and
    means for selectively illuminating the indicators of the plurality of keys to selectively indicate the first or second color, wherein the indication of the first color corresponds to a game move by the apparatus and the indication of the second color corresponds to a game move by the communication terminal.
2. The apparatus of claim 1, further comprising:
    means for establishing a communications link between said apparatus and said communication terminal; and means for activating, at said communication terminal and at said apparatus, a game mode to play a game between a first player associated with said first apparatus and a second player associated with said communication terminal.

3. The apparatus of claim 2, wherein at least one key of the plurality of keys is further configured to display a game piece for the game.

4. The apparatus of claim 2, wherein at least one key of the plurality of keys is further configured to display game information in either the first color or the second color.

5. The apparatus of claim 2, wherein the apparatus is configured to permit set up and play of a game without substantially interfering with an ongoing conversation over said communications link.

6. An apparatus, comprising:
- a keypad comprising a plurality of keys, wherein the keypad is configured to receive user input, wherein each of the plurality of keys comprises an indicator of a first color and an indicator of a second color;
- a transceiver configured to establish a communication channel with a remote device in response to a phone number associated with the remote device being received by the keypad as the user input, wherein the apparatus is configured to enter into a game with the remote device via the communication channel; and
- a display configured to display an identifier of the apparatus in the first color and to display an identifier of the remote device in the second color;
- wherein the plurality of keys are configured to selectively illuminate the indicators of the first color and the indicators of the second color, wherein the indication of the first color corresponds to a game move by the apparatus and the indication of the second color corresponds to a game move by the remote device.

7. The apparatus of claim 6, wherein at least one of the plurality of keys is further configured to display game pieces in either the first color or the second color.

8. The apparatus of claim 7, wherein the keypad is configured to display a gameboard for the game.

9. The apparatus of claim 7, wherein at least one plurality of keys is configured to flash in the second color when it is the remote device's turn to move in the game.

10. The apparatus of claim 7, wherein the apparatus is configured to permit set up and play of a game without substantially interfering with an ongoing conversation over said communications link.

11. A tangible computer readable storage medium including instructions executable by a computing device, the tangible computer readable storage medium integrated within a housing of a mobile device, the instructions comprising:
- instructions to establish a game with a remote device via a communications channel in response to a phone number associated with the remote device being entered into a keypad of the mobile device, wherein the keypad comprises a plurality of keys, and wherein each of the plurality of keys comprises an indicator of a first color and an indicator of a second color;
- instructions to selectively illuminate the indicators of the plurality of keys to selectively indicate the first or second color, wherein the indication of the first color corresponds to a game move by the mobile device and the indication of the second color corresponds to a game move by the remote device;
- instructions to display, using a display of the mobile device, an identifier of the mobile device in the first color and to display an identifier of the remote device in the second color;
- instructions to receive, by the keypad, user input for the game; and
- instructions to send game information to the remote device via the established communications channel.

12. The computer readable storage medium of claim 11, the instructions further comprising:
- instructions to generate dual tone multiple frequency signals in response to receiving user input via the keypad.

13. The computer readable storage medium of claim 11, wherein the instructions to selectively illuminate the indicators further comprise:
- instructions to illuminate the plurality of keys to generate game pieces.

* * * * *

UNITED STATES PATENT AND TRADEMARK OFFICE
CERTIFICATE OF CORRECTION

| | |
|---|---|
| PATENT NO. | : 8,012,024 B2 |
| APPLICATION NO. | : 11/249056 |
| DATED | : September 6, 2011 |
| INVENTOR(S) | : Wolinsky |

It is certified that error appears in the above-identified patent and that said Letters Patent is hereby corrected as shown below:

Title Page 2, item (56), under "Other Publications", in Column 2, Line 4, delete "2000m" and insert -- 2000 --.

Title Page 2, item (56), under "Other Publications", in Column 2, Line 15, delete "200;" and insert -- 2000; --.

Signed and Sealed this
Fourteenth Day of February, 2012

David J. Kappos
*Director of the United States Patent and Trademark Office*